United States Patent [19]

Rich

[11] Patent Number: 4,885,095
[45] Date of Patent: Dec. 5, 1989

[54] SYSTEM FOR SEPARATING SOLUTIONS

[75] Inventor: Ronald R. Rich, Edina, Minn.

[73] Assignee: Water Technologies, Inc., Eden Prairie, Minn.

[21] Appl. No.: 35,621

[22] Filed: Apr. 3, 1987

[51] Int. Cl.$^4$ .............................................. B01D 13/00
[52] U.S. Cl. .................................... 210/636; 210/652; 210/321.69
[58] Field of Search ............... 210/140, 651, 652, 636, 210/409, 323.2, 321.1, 433.2, 321.69; 426/656

[56] References Cited

U.S. PATENT DOCUMENTS

| | | | |
|---|---|---|---|
| 2,088,498 | 7/1937 | Tull | 204/5 |
| 2,865,823 | 12/1958 | Harris et al. | 204/151 |
| 3,074,863 | 1/1963 | Jasionowski | 204/151 |
| 3,528,901 | 9/1970 | Wallace et al. | 204/181 |
| 3,542,651 | 11/1970 | Yagishita | 202/169 |
| 3,637,467 | 1/1972 | Spatz | 204/14 |
| 3,836,457 | 9/1974 | Gross et al. | 210/23 |
| 4,165,288 | 8/1979 | Teed et al. | 210/23 H |
| 4,244,506 | 1/1981 | Stokes, Jr. et al. | 228/223 |
| 4,255,255 | 3/1981 | Ogawa et al. | 210/652 |
| 4,276,323 | 6/1981 | Oka et al. | 427/8 |
| 4,289,597 | 9/1981 | Grenda | 204/180 R |
| 4,357,220 | 11/1982 | Eisenmann | 204/180 R |
| 4,420,425 | 12/1983 | Lawhon | 426/656 X |
| 4,579,662 | 4/1986 | Jonsson | 210/636 |

FOREIGN PATENT DOCUMENTS

| | | |
|---|---|---|
| 2513751 | 9/1975 | Fed. Rep. of Germany ...... 210/636 |
| 2601859 | 7/1976 | Fed. Rep. of Germany ...... 210/636 |
| 2606586 | 8/1977 | Fed. Rep. of Germany . |
| 53-25265 | 8/1978 | Japan . |
| 57-297585 | 12/1982 | Japan . |
| 1071458 | 6/1967 | United Kingdom . |
| 1163351 | 9/1969 | United Kingdom . |

OTHER PUBLICATIONS

"The Mechanism of Demineralization of Aqueous Sodium Chloride Solutions by Flow, Under Pressure, Through Porous Membranes," S. Sourirajan; I&EC Fundamentals, vol. 2, No. 1, 2/1963, pp. 51–55.
"Separation of Some Inorganic Salts in Aqueous Solution by Flow, Under Pressure, Through Porous Cellulose Acetate Membranes," S. Sourirajan, I&EC Fundamentals, vol. 3, No. 3, 8/1964, pp. 206–210.
"The Economics of Electroplating Wastes Disposal," G. E. Barnes, Plating, 7/1969, pp. 727–731.
"Application of Reverse Osmosis to Electroplating Waste Treatment," A. Golomb, M. H. Jones, Ontario Research Foundation, Sheridan Park, Ontario, Canada, Proposal No. P.508-I, pp. 4–5, 7, 9–11.
"American Electroplaters' Society, Inc.", 1968–69 Annual Report, M. H. Dent, M. Ben, W. M. Tucker, 5/1969, pp. 592–594.
"Clean Water Through Plastics?", S. Wood, Modern Plastics, pp. 50–54, 7/1969, pp. 50–54.
"Performance of Porous Cellulose Acetate Membranes for the Reverse Osmosis Treatment of Hard and Waste Waters," A. R. Hauck, S. Sourirajan, Environmental Science & Technology, vol. 3, No. 12, 12/1969, pp. 1268–1275.
"American Electroplaters' Society, Inc., Quarterly Research Report," Jul. 1 to Sep. 30, 1969, W. Geissman, Plating, 2/1970, pp. 151–152.
"Application of Reverse Osmosis to Electroplating Waste Treatment," A. Golomb, Plating, 4/1970, p. 376.
"American Electroplaters' Society, Inc. Quarterly Research Report, Oct. 1 to Dec. 31, 1969," W. Geissman; Plating, 4/1970, pp. 377–378.
"American Electroplaters' Society, Inc. 1969–70 Annual Report," J. H. Lindsay, E. A. Parker, Plating, 5/1970, pp. 524–526.

(List continued on next page.)

Primary Examiner—Frank Spear
Attorney, Agent, or Firm—Kinney & Lange

[57] ABSTRACT

A system for separating an initial solution utilizing a single "reverse osmosis unit" operable to produce a concentrate and permeate output and means for reintroducing the concentrate output to the input on a time sharing basis with the initial solution so as to produce a further concentrated output with extended membrane life and with the ability to utilize membranes having lesser performance capabilities.

41 Claims, 3 Drawing Sheets

OTHER PUBLICATIONS

"Industrial Waste Treatment for Reverse Osmosis," J. G. Mahoney, M. E. Rowley, L. E. West; *Membrane Science and Technology, 1970, pp. 196-208.*

"Application of Reverse Osmosis to Electroplating Waste Treatment," A. Golomb, Research Project No. 31, Ontario Research Foundation, Sheridan Park, Ontario, Canada, Apr. 1, 1969–Mar. 31, 1973.

"Reverse Osmosis for the Treatment of Metal Waste Solutions," V. S. Sastri, J. Scient. Ind. Res., vol. 35, 2/1976, pp. 88–90.

"Recovery Techniques in Electroplating," E. P. Hall, D. J. Lisdas, E. E. Auerbach, *Plating and Surface Finishing,* vol. 66, No. 2, 2/1979, pp. 43–52.

"A Case History of Reverse Osmosis Used for Nickel Recovery in Bumper Recycling," D. D. Spatz, *Plating and Surface Finishing,* 7/1979, pp. 28–31.

"Reverse Osmosis and Ultrafiltration in the Plating Shop," P. S. Cartwright, *Plating and Surface Finishing,* 4/1981, pp. 40–45.

"Reverse Osmosis in the Metal Finishing Industry," P. Crampton, *Metal Finishing,* vol. 80, No. 3, 3/1982, pp. 21–27.

SYSTEM FOR SEPARATING SOLUTIONS

BACKGROUND OF THE INVENTION

1. Field of the Invention

The present invention relates to a process and apparatus for separating liquids into more concentrated and less concentrated portions for a variety of applications including treatment of industrial wastes, separation of plating solutions, and concentration and refining of chemicals.

2. Description of the Prior Art

It is often desirable in, for example, plating processes to concentrate the plating chemicals which accumulate in the plating rinses for purposes of returning the concentrated portion to the plating solutions and, alternately, returning the remaining less concentrated liquid portion to be reused as rinse. A number of advantages accrue from such a process. For example, recovery of the plating chemicals is not only economically desirable, it may reduce or eliminate the discarding of contaminents which are ecologically harmful. Reuse of the less concentrated portion reduces water consumption and accordingly the prior art has sought economical ways to reuse the solution from plating rinse baths.

Various methods and apparatus have been proposed in the past for separating and recovering such solutions and some of these have used "reverse osmosis units" to concentrate a portion of the chemicals from the rinsing baths. As used herein, the term "reverse osmosis unit" means a device in which a pressure is applied to a solution to be concentrated of sufficient magnitude to cause the solution to pass through a membrane to a less concentrated side while the chemicals being concentrated are restricted from passing through the membrane. It is intended that the term include the rather analogous process referred to as "nanofiltration" (sometimes referred to as separation of dissolved larger molecular weight chemicals) which, like reverse osmosis, operates to separate an input solution into two outputs one of which is more concentrated and the other of which is less concentrated than the input solution. While reverse osmosis units have a number of advantages, they also have the disadvantage that membrane performance and lifetime is reduced when processing liquids of high concentration at extremes of pH, oxidizer content or that otherwise react with the membrane constituents. In addition, the resulting solution of chemicals is normally at an insufficient concentration to be returned directly to the plating bath. To solve the second problem, it has been suggested that a concentrate from a reverse osmosis unit be reconcentrated in a second reverse osmosis unit and, if necessary, the concentrate from the second reverse osmosis unit be again reconcentrated in a third osmosis unit so as to bring the concentrate to a sufficient concentration for return to the plating bath. Examples of such prior art techniques may be found in the Ogawa et al U.S. Pat. No. 4,255,255 and the Gross et al U.S. Pat. No. 3,836,457. Such prior art systems, however, employing more than one reverse osmosis unit, become extremely expensive to operate and have generally been found to be economically unsound. Furthermore, the problem of short membrane life has heretofor remained unsolved.

SUMMARY OF THE INVENTION

The present invention overcomes the problems in the prior art by providing a system in which a single reverse osmosis unit is employed to separate a solution into a permeate and a specially highly concentrated concentrate. Instead of sending the concentrate to a second reverse osmosis unit, the present invention returns the first concentrate to the feed input of the same reverse osmosis unit from time to time. During operation, the feed input is connected to the initial solution for a majority of the time but, for relatively short periods of time the feed input is disconnected from the initial solution and is changed to receive the first concentrate. The initial concentrate is now reconcentrated to produce a second more concentrated output. The second concentrate output being considerably more concentrated than the first may, in some cases, be used to replenish the plating solution directly. If not, the second concentrate may itself be substituted as the input to the single reverse osmosis unit so as to produce yet a third concentrate which is yet more highly concentrated. This procedure may be repeated as often as needed until the desired concentration is obtained but, in the usual case, no more than four concentrates are normally necessary.

The use of a single reverse osmosis unit lowers the initial cost of the system and I have found that a single unit can be run under light load conditions for a long period of time and under heavy load conditions for much shorter period of time and this results in longer membrane life. As an example, if the original solution is concentrated by the reverse osmosis unit for 90% of its operation time it is operating under a light load condition most of the time. Then when the more concentrated inputs are applied to the reverse osmosis unit during the remaining 10% of its operation, the heavy load is less wearing on the system and the membrane life is extended.

A more complete understanding of the present invention will be obtained upon examination of the following specification and drawings.

DETAILED DESCRIPTION OF THE PREFERRED EMBODIMENTS

Figure 1:
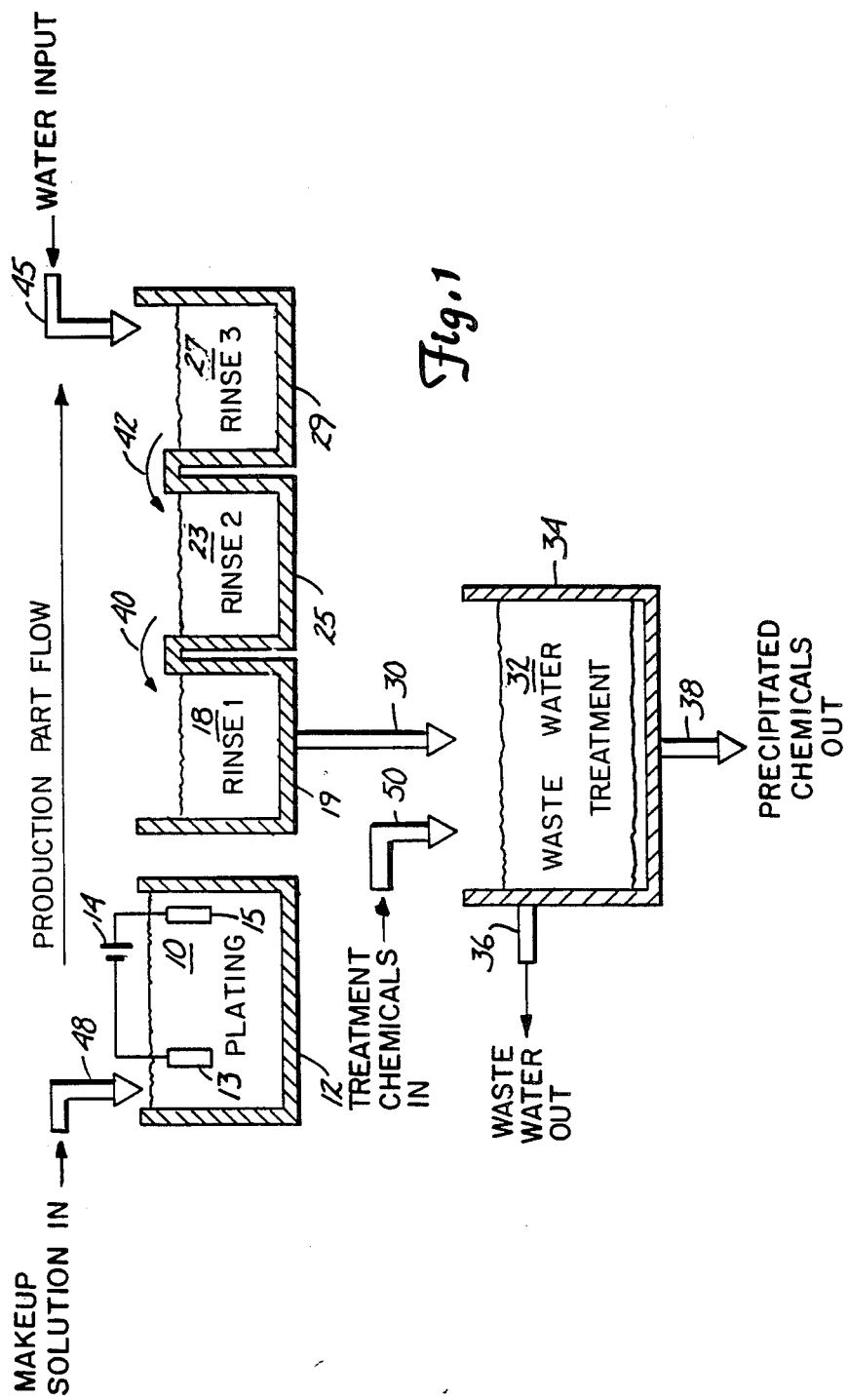
FIG. 1 is a diagram showing a conventional plating system.

While the present invention has a wide variety of applications in all fields of liquid operation including, for example, electroplating, electroless plating, etching, pickling, conversion coatings, seal coatings, organic contaminant removal, alcohol/water separation and others, its use will be described in connection with an electroplating system such as is shown in FIG. 1. It is to be understood however, that the application of the present invention is not limited to plating systems.

In FIG. 1, a plating solution 10 is shown contained in a tank 12. Solution 10 may be a concentrated solution of metallic salts and water useful in producing a thin coating of metal on the object to be plated. An article 13 to be plated is placed within the solution 10 and is connected to a source of direct current such as a battery 14, the other side of which is connected to a plate 15 containing the metal to be plated and which is also in the solution 10. After a time sufficient to produce the desired thickness of coating an article 13 it is removed from the solution 10 and the excess solution adhering thereto is rinsed off. While rinsing may be accomplished in a variety of ways such as spraying or flooding, one of the more efficient methods is multiple immersion rinsing in countercurrent flow tanks. Three tanks are sometimes appropriate and accordingly in FIG. 1, a first rinse solution 18 is shown in a container 19. After leaving the plating solution 10, the part is placed within the first rinse solution 18 where most of the excess plating material is removed. The concentration of residual chemicals in container 19 is higher than the final quality desired and accordingly, the product is placed in a second rinse 23 shown in a container 25 which has a concentration less than solution 18 but still greater than the final desired concentration and consequently the article is placed in a third rinse 27 shown in container 29. Obviously, over a period of time, the first rinse 18 becomes quite concentrated with plating chemicals, the second rinse 23 becomes less concentrated but still contains significant amounts of chemicals, and the final rinse 27 becomes lightly concentrated and requires a cleaner supply to maintain rinsing performance. More or less rinsing steps or methods than those three shown in FIG. 1, of course, may be used.

In countercurrent rinsing, to help keep the rinse water clean, typically the solution 18 is, from time to time or continuously, drained from container 19 by means of a fluid transport means 30 into a waste water treatment solution 32 shown contained in a container 34. The waste water treatment operates to chemically precipitate the excess chemicals from the water before the used rinse water is discarded. The used rinse water may be fed via a transport 36 to a sewage output and the precipitated concentrated chemicals may be fed by a transport 38 to a hazardous waste container and properly disposed of.

To replenish the rinse water 18, the rinse 23 is transferred to container 19 as shown by arrow 40, from time to time or continuously. Likewise, to replenish rinse 23, rinse 27 is transferred as shown by arrow 42 to container 25 from time to time. To replenish the rinse 27, a water input 45 is shown which, from time to time or continuously, deposits no or low chemical concentration water into rinse 27.

Likewise, to replenish the dragged-out plating solution 10, additional solution is fed thereto from time to time as shown by a solution input transport 48.

To cause precipitation in the waste water treatment of solution 32, solid or liquid chemicals may be supplied to tank 34 by an input shown in FIG. 1 by reference numeral 50.

The present invention can be used with the rinse system of FIG. 1 to treat the rinse solution 18 in such a way that the plating chemicals that are in the rinse water can be concentrated to a sufficient degree to be returned to the plating solution 10. Such a system will be described in connection with FIG. 2.

Figure 2:
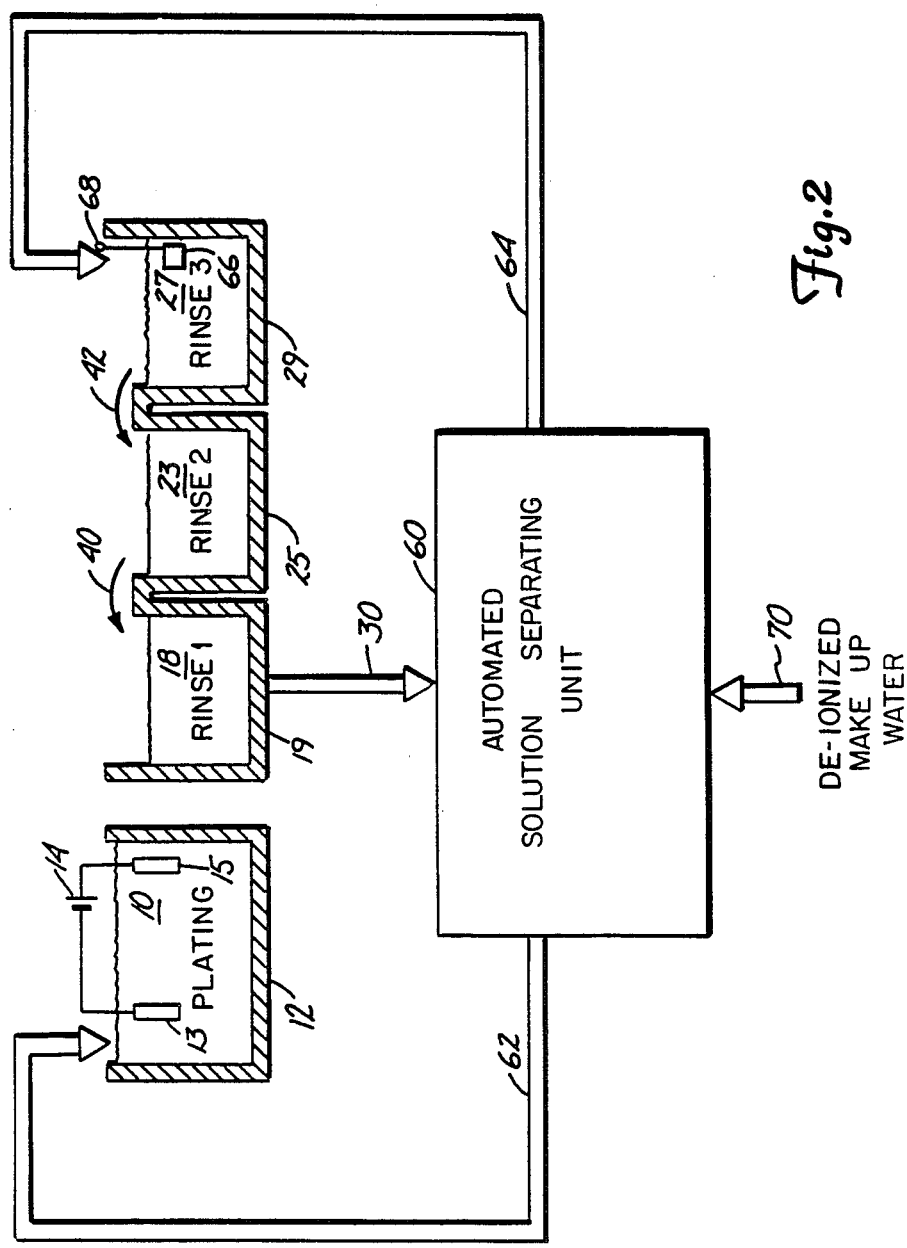
FIG. 2 is a diagram showing the present invention.

In FIG. 2, the plating solution 10 in container 12 and the rinse solutions 18, 23 and 27 in containers 19, 25 and 29, respectively, are all shown as they were in FIG. 1. The rinse discharge from tank 19 is now presented by fluid transport 30 to an automated solution separating unit shown as box 60, the operation of which will be explained in connection with FIG. 3. Unit 60 operates to separate the feed input from fluid transport 30 into two outputs, the first of which is a highly concentrated output shown in fluid transport means 62 and the second of which is a low concentrated output shown in fluid transport means 64. The highly concentrated output in fluid transport 62 is often of sufficient strength to be returned to the plating solution 10 as is shown in FIG. 2 and the low concentrated output in fluid transport 64 is sufficiently pure to be returned to the rinse solution 27 as is often shown in FIG. 2. Alternately, the solution in fluid transport 62 can be effectively processed by a number of techniques that allow reuse or recycling of portions of its chemical constituents. The concentration of the solution 27 in container 29 is monitored by, for example, a conductivity sensor 66 having an output 68 which is presented to a microprocessor as will be explained in connection with FIG. 3. To replenish the water lost to evaporation in the rinse tanks 18, 23 and 27, a makeup water supply is shown leading to the unit 60 by way of a fluid transport 70.

Figure 3:
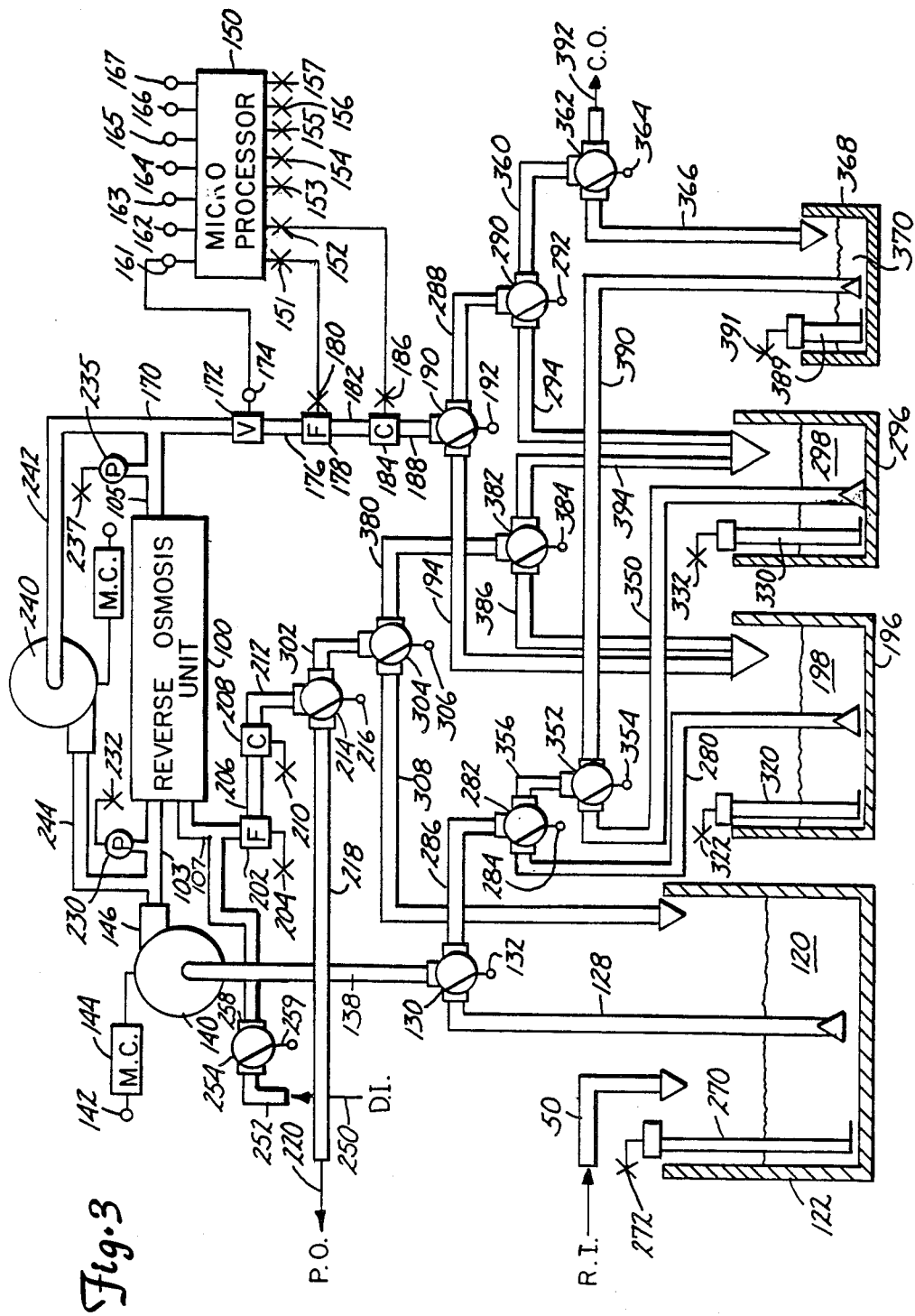
FIG. 3 is a schematic diagram showing the system for separating solutions of the present invention.

Turning now to FIG. 3, the operation of the automated solution separating unit 60 will be explained.

In FIG. 3, a single reverse osmosis unit 100 is shown which may be of a type constructed from one or more pressure vessels and one or more spiral wound reverse osmosis membranes obtainable in the art.

Reverse osmosis unit 100 has a feed input conduit 103, a concentrate output conduit 105 and a permeate output conduit 107. The reverse osmosis unit 100 operates to receive an initial solution through the input conduit 103 and to separate the initial solution into a first component which is more concentrated than the initial solution and which leaves the reverse osmosis unit 100 via the concentrate output conduit 105 and into a second component which is less concentrated than the initial solution and which leaves the reverse osmosis unit 100 via the permeate output conduit 107.

The initial solution to be treated is shown in FIG. 3 in the lower left hand portion of the drawing as a solution 120 in a container 122. The solution 120 in container 122 is received from the rinse 18 of FIG. 2 through the fluid transport 30. Of course, the container 122 is not necessarily required since the input to the reverse osmosis unit 100 may be connected directly to the output of rinse 18 in FIG. 2.

The solution 120 is presented to the input of the reverse osmosis unit 100 by way of a first controllable transport system comprising a conduit 128, a three-way valve 130 having a control input 132, a conduit 138, a fluid pump 140 having a control input 142 which operates through a motor control drive circuit 144 to move the solution 120 to an output 146 connected to the feed input 103 of the reverse osmosis unit 100. The three-way valves, fluid pumps and motor control circuits described herein may be of conventional type. As will be explained in greater detail hereinafter, the controls for valve 130 and pump 140 may be performed by a microprocessor based controller 150 shown in the upper right hand portion of FIG. 3 having a plurality of input terminals 151-157 and a plurality of output terminals 161-167. The number of inputs and outputs are indicative only and in actual practice are however many are needed to receive desired signals and to perform desired controls.

The output 105 of reverse osmosis unit 100, containing the concentrate, is presented via a second controllable transport system comprising a conduit 170, a needle valve 172 having a control input 174, a conduit 176, a flow meter 178 having an output terminal 180, a conduit 182, a conductivity meter 184 having an output terminal 186, a conduit 188, a three-way valve 190 having a control input 192 and a first output conduit 194 leading to a container 196 to receive the first concentrate 198 therein. The flow meters and conductivity meters described herein may be of conventional type. Needle valve 172 is preferably a conventional variable orifice valve that may be operated automatically, quickly, and accurately as, for example, by a stepper motor controlled by the microprocessor 150.

The reverse osmosis unit 100 supplies the permeate from the output 107 by a third controllable transport system comprising a flow meter 202 having an output terminal 204, a conduit 206, a conductivity meter 208 having an output terminal 210, a conduit 212, a three-way valve 214 having a control input 216 and a first output conduit 218 which produces a first permeate output shown by arrow 220.

The pressure at the input 103 of reverse osmosis unit 100 is monitored by a pressure gauge 230 having an output 232. The pressure at the concentrate output 105 is measured by a pressure gauge 235 having an output 237. A second pump 240 is shown in FIG. 1 connected between the output 105 and the input 103 by way of conduits 242 and 244 respectively. The purpose of pump 240 is to cause turbulence in the reverse osmosis unit 100 so as to prevent a buildup of concentration at the membrane surfaces therein. The output terminals of pressure gauges 230 and 235 are presented to the microprocessor 150 which uses the values to help limit the maximum pressure of pump 140 and to determine the performance of pump 240. Pump 240 is controlled via input 246 and motor control circuit 248. The output terminal 204 of flowmeter 202 primarily controls the operation of pump 140.

The outputs of the various pressure gauges, flow meters and conductivity meters, are connected by means, not shown, to the various inputs 151-157 of microprocessor 150; and the various outputs 161-167 of microprocessor 150 are connected by means, not shown, to the various input terminals of the pumps, valves and motor control circuits all for purposes to be described hereinafter.

To replace liquid which is lost in the rinse system from evaporation and other means, a de-ionized water input shown by arrow 250, as also seen in FIG. 2 may be presented by a conduit 252 through a valve 254 having a control input 259 and a conduit 258 to the output 107.

In the apparatus described thus far, the rinse solution 18 of FIG. 2 is presented via tank 122 through valves 130 and pump 140 to the input 103 of the reverse osmosis unit 100. This solution is operated upon to produce the concentrate at output 105 which is presented to tank 196 and the permeate at output 107 which is presented to the permeate output 220 which may be fed back to the third rinse 27 of FIG. 2 via a conduit 64. The procedure thus far described occupies the majority of the time operation of the system which, for purposes of explanation, will be assumed to be about 90% of the operation. Thus it is seen that for approximately 90% of the time, the rinse solution 18 from FIG. 2 is operated upon by the reverse osmosis unit in a "light load" situation to produce a concentrate which is normally not sufficiently concentrated to be reintroduced to the plating solution at output 105, but a permeate at output 107 which is normally sufficiently pure to be presented back to the rinse solution 27 of FIG. 2. The tank 122 is chosen to be large enough to receive the immersed parts displacement volume of the rinse 18 and to serve as a permeate receiving vessel for subsequent operations. A liquid level and conductivity sensor combination 270 is shown having an output 272 which may be presented to the microprocessor 150 for purposes of controlling the conductivity and fluid level of the solution in tank 196. The fluid level and conductivity sensors described herein may be of a conventional type.

Based upon the various inputs received by the microprocessor 150 through conductivity meter 66 of FIG. 2 or other means, a decision is made to interrupt the above described process from time to time so as to introduce the concentrate 198 from tank 196 to the feed input 103 of the reverse osmosis unit 100 so as to produce a yet more highly concentrated output at conduit 105. Accordingly, when called for by the microprocessor 150, valve 130 may be switched so as to shut off conduit 128 from the input 103 of reverse osmosis unit 100. In so doing, a path is opened up between the first concentrate 198 via a conduit 280, a three-way valve 282 having a control input 284, a conduit 286 and valve 130 through the conduit 138, pump 140 and output 146 to the input 103 of reverse osmosis unit 100. Accordingly, during this second and shorter period of time, a heavier load in the form of a more concentrated input is presented to the reverse osmosis unit 100 which then operates to produce a more highly concentrated solution at output 105. A new permeate is also now presented at output 107. As the microprocessor 150 operates valve 130, it may determine to also operate valves 190 and 214. Operation of valve 190 causes the output at conduit 105 to be switched from conduit 194 to a conduit 288 and then to a three-way valve 290 having a control input 292 and a first output conduit 294 leading to a second containing tank 296 so as to provide a container for the second concentrate 298 therein. It should be understood that the concentrate 298 may be sufficiently concentrated to be returned to the plating solution 10 of FIG. 2. If, it is sufficiently concentrated at this point, instead of leading to tank 296, output 294 could be made to lead back to the plating solution 10 of FIG. 2.

The permeate at output 107 is, most often, no longer fed to the permeate output 220 and valve 214 now directs the permeate through a conduit 302 and a valve 304 having a control input 306 to a first output conduit 308 which leads either to a separate holding tank or, as shown, back to the container 122 containing solution 120. The reason for this is that the second permeate output from reverse osmosis unit 100 is, in all likelihood, insufficiently pure to be fed back to the rinse solution 27 of FIG. 2, but will be sufficiently pure to form part of the rinse solution 120.

In actual practice, the conductivity meters 184 and 208 monitor the concentrations of the concentrate at output 105 and the permeate at output 107 and the microprocessor 150 determines from these values where the concentrate and the permeate should go and operates the appropriate valves accordingly.

It is thus seen that during the second and shorter operation, a now more highly concentrated solution is presented to container 296 with the less concentrated solution 198 forming the input.

To prevent the conductivity of solution 198 from becoming too great or too small or tank 196 from becoming too full, a second liquid level conductivity sensor combination 320 is shown in FIG. 3 having an output 322 which may be connected to one of the inputs of microprocessor 150. Similarly, to prevent tank 296 from becoming too full and solution 298 from becoming too concentrated or not concentrated enough, a third liquid level conductivity sensor combination 330 is shown having an input 332 which may be presented to one of the inputs of microprocessor 150.

The system described thus far is sometimes sufficient for the entire operation of the system. In many cases, however, the concentrate 298 will still be insufficiently great for the plating bath 10 of FIG. 2 and accordingly, the present invention can be extended to further concentrate the now more concentrated solution 298. This may be performed with the same reverse osmosis unit 100 by again time sharing the operation for, for example, 1% of the operation.

Thus when it is desired to reconcentrate solution 298, microprocessor 150 will operate to change valve 282 via input terminal 284 so as to shut off the flow from conduit 280 and to permit a flow from tank 296 via a conduit 350, a three-way valve 352 having an input terminal 354, a conduit 356 and valve 282, conduit 286, valve 130, conduit 138, pump 140 and input 103 to reverse osmosis unit 100. Thus for a very short period of operation, the yet more highly concentrated solution 298 will form the feed input of reverse osmosis unit 100 which will then produce a yet more highly concentrated solution at output 105. When microprocessor 150 operates valve 352, it may determine to also operate valve 290 via input 292 and valve 304 via input 306. When valve 290 is operated, the more highly concentrated solution at output 105 is now presented via a conduit 360, a valve 362 having an input 364 and a first output conduit 366 which leads to a third containing tank 368 for containing the yet more highly concentrated solution 370. Generally, the concentrate 370 will be sufficiently concentrated to be fed directly back to plating solution 10 and accordingly tank 368 may not be needed in most operations.

The new permeate which results from this latter process will now be stored in another container or, as shown, when valve 304 is operated the permeate is now fed via conduits 380, three-way valve 382 having an input 384 and a first output 386 back to the tank 196 which houses the first concentrate 198. Accordingly, while the permeate in this process is normally too concentrated to be presented to the first solution 120, it will be pure enough to be used in the first concentrate 198. It will be understood that the flow of solution to tank 368 is far slower than that to tank 296 and that in turn is slower than that to 196 which itself is slower than that to tank 122. Accordingly in FIG. 1 it is seen that the tanks are shown of various sizes with tank 122 being about large enough to have the contents of tanks 196, 296 and 368 all contained therein, tank 196 is large enough to have the contents of tanks 296 and 368 therein and tank 296 is large enough to hold the contents of tank 368 therein. To prevent the conductivity of solution 370 from becoming too great or too small or tank 368 from becoming too full, a fourth liquid level conductivity sensor combination 389 is shown having an output terminal 391 which would be connected to the microprocessor 150.

Thus in the system described so far, a very concentrated solution 370 is obtained but only during a very short period of operation of the reverse osmosis unit 100.

In some cases, if membrane separation performance on a particular solution is not high, the concentration of concentrate 370 may be insufficient to be returned to the plating solution 10. In such event, the whole procedure can be operated one or more times for a very short period of time (say 1/10 of 1% of the operation). When this is called for, the microprocessor 150 will operate valve 352 via input 354 so as to shut off conduit 350 and to supply the solution 370 via a conduit 390 to valve 352, conduit 356, valve 282, conduit 286, valve 130, conduit 138, pump 140 and input 103 to reverse osmosis unit 100. In this event, a yet more highly concentrated solution will appear at output 105. Microprocessor 150 may determine to then simultaneously operate valve 362 so that output 105 is no longer presented to tank 368 but now appears as a final concentrated output shown by arrow 392.

The permeate appearing at output 107 will now normally be too concentrated to be fed to tank 196 and accordingly the microprocessor 150 may now determine to operate valve 382 so that conduit 386 no longer receives the permeate but rather the permeate is now fed to another holding container or, as shown, via a conduit 394 to tank 296 where it joins the concentrate 298.

Of course, further concentrations may be provided especially, for example, on low molecular weight alcohol/water mixtures or with low performance membranes, but I have found that the four described herein are sufficient for most purposes.

While I have shown how higher and higher concentrations may be obtained with the present invention, it should be understood that the invention is not necessarily used to obtain extremely high concentrations. Rather, because some membranes do not have high enough performance characteristics, their use does not produce adequate concentrations where higher performance membranes do. Accordingly, my invention is useful to produce sufficiently high concentrations even when lower performance membranes are employed.

It is thus seen that I have provided a system which utilizes a single reverse osmosis unit in a very economical fashion to supply solutions of any desired concentration to the output. In so providing the concentrate I have also provided a system which time shares the reverse osmosis unit in a way that preserves the membrane for a much longer period of time than was previously obtainable and is effectively capable of using lower performance membranes. It will also be understood that many obvious modifications will occur to those skilled in the art. For example, the time sharing principle herein described can be used not only to obtain higher and higher concentrations of concentrate, but also to clean the permeate to purer and purer forms than might be obtained with a single operation. Also, while I have shown a microprocessor as controlling the various valves and pumps in the present invention, the whole apparatus may be operated manually by an operator who observes the various pressures and concentrations. I therefore do not wish to be limited to the specific disclosures used in connection with describing the preferred embodiments. I specifically intend, as previously mentioned, to include a nanofiltration apparatus within the definition of "reverse osmosis unit."

What is claimed is:

1. Apparatus for concentrating an initial solution comprising:

a reverse osmosis unit having an input, a concentrate output and a permeate output;

first means operable to supply only the initial solution to the input during a first time period, the reverse osmosis unit operable during the first time period to provide, at the concentrate output, a first concentrate solution of concentration greater than the initial solution; and second means operable to supply only the first concentrate solution to the input during a second time period, the reverse osmosis unit operable during the second time period to provide, at the concentrate output, a second concentrate solution of concentration greater than the first concentrate solution.

2. Apparatus according to claim 1 wherein the reverse osmosis unit is operable during the first time period to provide, at the permeate output, a first permeate solution of concentration less than the initial solution and, during the second time period, to provide, at the permeate output, a second permeate solution of concentration less than the first concentrate solution.

3. Apparatus according to claim 2 wherein the first means includes first controllable transport means operable during the first time period to supply only the initial solution to the input and the second means includes second controllable transport means operable during the second time period and, in cooperation with the first controllable transport means, to supply only the first concentrate solution to the input.

4. Apparatus according to claim 3 wherein the first means further includes first containing means for receiving the initial solution, and the second means further includes second containing means for receiving the first concentrate solution.

5. Apparatus according to claim 4 wherein the first containing means also receives the first permeate solution, and the second containing means also receives the second permeate solution.

6. Apparatus according to claim 3 wherein the first controllable transport means includes a fluid pump and a first three-way valve, the first three-way valve operable to a first position during the first time period and to a second position during the second time period.

7. Apparatus according to claim 6 further including control means connected to control the operation of the fluid pump and the first three-way valve.

8. Apparatus according to claim 7 further including fluid concentration sensing means having an output connected to the control means.

9. Apparatus according to claim 1 further including:
third means operable to supply only the second concentrate solution to the input during a third time period, the reverse osmosis unit operable during the third time period to provide, at the concentrate output, a third concentrate solution of concentration greater than the second concentrate solution.

10. Apparatus according to claim 9 wherein the reverse osmosis unit is operable during the first time period to provide, at the permeate output, a first permeate solution of concentration less than the initial solution, during the second time period, to provide, at the permeate output, a second permeate solution of concentration less than the first concentrate solution and during the third time period, to provide, at the permeate output, a third permeate solution of concentration less than the second concentrate solution.

11. Apparatus according to claim 10 wherein the first means includes first controllable transport means operable during the first time period to supply only the initial solution to the input, the second means includes second controllable transport means operable during the second time period and, in cooperation with the first controllable transport means, to supply only the first concentrate solution to the input, and wherein the third means includes third controllable transport means operable during the third time period and, in cooperation with the first and second controllable transport means, to supply only the second concentrate solution to the input.

12. Apparatus according to claim 11 wherein the first means further includes first containing means for receiving the initial solution, the second means further includes second containing means for receiving the first concentrate solution, and wherein the third means further includes third containing means for receiving the second concentrate solution.

13. Apparatus according to claim 12 wherein the first containing means also receives the first permeate solution, the second containing means also receives the second permeate solution, and the third containing means also receives the third permeate solution.

14. Apparatus according to claim 11 wherein the first controllable transport means includes a fluid pump and a first three-way valve, the first three-way valve operable to a first position during the first time period and to a second position during the second time period, and wherein the second controllable transport means includes second three-way valve, the second three-way valve connected to the first three-way valve and operable to a first position during the first and second time period and to a second position during the third time period.

15. Apparatus according to claim 14 further including control means connected to control the operation of the fluid pump and the first three-way valve, and to control the operation of the second three-way valve.

16. Apparatus according to claim 15 further including fluid concentration sensing means an output connected to the control means.

17. Apparatus according to claim 9 wherein the first means includes first controllable transport means operable during the first time period to supply only the initial solution to the input, the second means includes second controllable transport means operable during the second time period and, in cooperation with the first controllable transport means, to supply only the first concentrate solution to the input, and wherein the third means includes third controllable transport means operable during the third time period and, in cooperation with the first and second controllable transport means, to supply only the second concentrate solution to the input.

18. Apparatus according to claim 17 wherein the first means further includes first containing means for receiving the initial solution, the second means further includes second containing means for receiving the first concentrate solution, and wherein the third means further includes third containing means for receiving the second concentrate solution.

19. Apparatus according to claim 17 wherein the first controllable transport means includes a fluid pump and a first three-way valve, the first three-way valve operable to a first position during the first time period and to a second position during the second time period, and wherein the second controllable transport means includes a second three-way valve, the second three-way valve connected to the first three-way valve and operable to a first position during the first and second time period and to a second position during the third time period.

20. Apparatus according to claim 19 further including control means connected to control the operation of the fluid pump and the first three-way valve, and to control the operation of the second three-way valve.

21. Apparatus according to claim 20 further including fluid concentration sensing means having an output connected to the control means.

22. Apparatus according to claim 1 wherein the first means includes first controllable transport means operable during the first time period to supply only the initial solution to the input and the second means includes second controllable transport means operable during the second time period and, in cooperation with the first controllable transport means, to supply only the first concentrate solution to the input.

23. Apparatus according to claim 22 wherein the first means further includes first containing means for receiving the initial solution, and the second means further includes second containing means for receiving the first concentrate solution.

24. Apparatus according to claim 23 further including control means having an input and an output, the output connected to the first controllable transport means to provide control therefore and the first containing means including fluid quantity means having an output connected to the input of the control means.

25. Apparatus according to claim 22 wherein the first controllable transport means includes a fluid pump and a first three-way valve, the first three-way valve operable to a first position during the first time period and to a second position during the second time period.

26. Apparatus according to claim 25 further including control means connected to control the operation of the fluid pump and the first three-way valve.

27. Apparatus according to claim 26 further including fluid concentration sensing means having an output connected to the control means.

28. Apparatus according to claim 1 further including means connected between the concentrate output and the input to produce turbulence in the reverse osmosis unit to minimize buildup of concentrate on a membrane therein.

29. The method of concentrating an initial solution comprising the steps of:
(1) Applying the solution to the feed input of a reverse osmosis unit during a first time period to provide a first concentrate at the concentrate output thereof and a first permeate at the permeate output thereof; and
(2) disconnecting the feed input from the initial solution and connecting it to the first concentrate during a second time period to provide a second concentrate at the concentrate output thereof and a second permeate at the permeate output thereof.

30. The method of claim 29 further including the step of disconnecting the feed input from the first concentrate and connecting it to the second concentrate during a third time period to provide a third concentrate at the concentrate output thereof and a third permeate at the permeate output thereof.

31. The method of claim 30 further including the step of disconnecting the feed input from the second concentrate and connecting it to the third concentrate during a fourth time period to provide a fourth concentrate at the concentrate output thereof and a fourth permeate at the permeate output thereof.

32. The method of claim 31 wherein the second time period is less than half as long as the first time period and the third time period is less than half as long as the second time period.

33. The method of claim 30 wherein the second time period is less than half as long as the first time period, the third time period is less than half as long as the second time period, and the fourth time period is less than half as long as the third time period.

34. The method of claim 29 wherein the second time period is less than half as long as the first time period.

35. Apparatus for increasing the performance of a low performance membrane in a reverse osmosis unit having an input connected to receive an initial solution and an output for delivering an output solution comprising:
means for disconnecting the input from the initial solution and connecting the input to receive the output solution on a time sharing basis.

36. A method for increasing the performance of a low performance membrane in a reverse osmosis unit having an input for receiving an initial solution and an output for delivering an output solution comprising the steps of:
(1) connecting the input to receive only the initial solution and provide a first output solution during a first time period; and
(2) connecting the input to receive only the first output solution and provide a second output solution during a second time period.

37. Apparatus for extending the membrane performance life of a reverse osmosis unit, when concentrating potentially damaging solutions which at higher concentrations can damage membrane separation performance, comprising:
means for causing time sharing of the higher concentrations with the less high concentrations so that the membrane surface is exposed to the higher concentrations for a shorter period of time than the less high concentrations.

38. Apparatus for concentrating an initial solution comprising:
a reverse osmosis unit having an input, a concentrate output and a permeate output;
first means operable to supply only the initial solution to the input during a first time period, the reverse osmosis unit operable during the first time period to provide, at the concentrate output, a first concentrate solution of concentration greater than the initial solution;
collection means connected to the concentrate output to collect a supply of the first concentrate; and
second means connected to the collection means operable to supply only the first concentrate solution to the input during a second time period, the reverse osmosis unit operable during the second time period to provide, at the concentrate output, a second concentrate solution of concentration greater than the first concentrate solution.

39. The method of concentrating an initial solution comprising the steps of:
(1) applying the solution to the feed input of a reverse osmosis unit during a first time period to provide a first concentrate at the concentrate output thereof and a first permeate at the permeate output thereof;
(2) collecting a supply of first concentrate; and
(3) disconnecting the feed input from the initial solution and connecting it to the supply of first concentrate during a second time period to provide a second concentrate at the concentrate output thereof and a second permeate at the permeate output thereof.

40. A method for increasing the performance of a low performance membrane in a reverse osmosis unit having an input for receiving an initial solution and an output for delivering an output solution comprising the steps of:
 (1) connecting the input to receive only the initial solution and provide a first output solution during a first time period;
 (2) collecting a supply of first output solution; and
 (3) connecting the input to the supply of first output solution to receive only the first output solution and provide a second output solution during a second time period.

41. Apparatus for extending the membrane performance life of a reverse osmosis unit, when concentrating potentially damaging solutions which at higher concentrations can damage membrane separation performance comprising:
 first means for connecting the unit to a supply of higher concentration;
 second means for connecting the unit to a supply of lower concentration; and
 third means operable to connected the first and second means to the unit during mutually exclusive time periods for causing time sharing of the higher concentrations with the less high concentrations so that the membrane surface is exposed to the higher concentrations for a shorter period of time than the less high concentrations.

* * * * *

UNITED STATES PATENT AND TRADEMARK OFFICE
CERTIFICATE OF CORRECTION

PATENT NO. : 4,885,095

DATED : December 5, 1989

INVENTOR(S) : Ronald R. Rich

It is certified that error appears in the above-identified patent and that said Letters Patent is hereby corrected as shown below:

Column 10, line 35, following "means" insert --having--.

Signed and Sealed this

Ninth Day of October, 1990

Attest:

HARRY F. MANBECK, JR.

*Attesting Officer*   *Commissioner of Patents and Trademarks*